2,898,337

PROCESS IMPROVEMENT FOR VAT DYES

Justin A. McSheehy, Somerville, N.J., assignor to American Cyanamid Company, New York, N.Y., a corporation of Maine No Drawing. Application May 21, 1956
Serial No. 585,941

17 Claims. (Cl. 260—263)

This invention relates to an improved process for the preparation of vat dyes, and more specifically it relates to an improved process for obtaining the vat dyes from their leuco forms.

The vat dyes are one of the most important classes of synthetic organic dyestuffs. They are manufactured in very large quantities by a number of series of complex organic reactions. In a number of cases, these reactions produce as their end product the vat dye in its leuco form, which as a last step must be oxidized to the corresponding oxo form. In many other cases, it is desirable to purify the dyestuff by vatting and removing impurities, followed by recovery of the oxidized or oxo form of the vat dye. Both of these situations result in the need for oxidizing leuco vat dyes to their oxo form in large quantities. When the reactions forming the dyestuff have formed it in the leuco form, it is also customary in many cases to use the limited solubility of the leuco to premit purification before oxidizing to the vat dye itself.

For example, in the preparation of indanthrone by the customary fusion of 2-aminoanthraquinone with alkali hydroxides in the presence of an oxidizing agent, followed by dilution with a large amount of water, the dyestuff is obtained partly in the leuco form. To effect purification, hydrosulfite is added to reduce it all to the leuco form and this, after being allowed to crystallize, is separated from impurities by filtration. In order to obtain the final vat dye, the leuco indanthrone is then slurried in strongly alkaline solution and oxidized by aerating at elevated temperatures.

Isodibenzanthrone is prepared by various syntheses which give small amounts of dibenzanthrone as a by-product. Because of the different solubilities of the leuco form of these two isomers, it is customary to reduce the mixture and isolate the less soluble leuco isodibenzanthrone, in order to separate it from its isomer. The isolated leuco isodibenzanthrone then must be reslurried in a caustic solution and oxidized by long aeration and at high temperatures.

Another important vat dye, pyranthrone, is formed by the caustic fusion of dimethyldianthraquinonyl. The product of the fusion on drowning in water is a slurry of the leuco pyranthrone. This must be oxidized by aeration to the corresponding vat dye.

In the above examples, the products were formed from various fusion reactions, which formed the material more or less in the reduced or leuco form. In the case of thioindigoid vat dyes, it is often necessary, in order to produce a particular particle size of the dyestuff, to reduce the vat dye to the leuco and then to re-oxidize it to the oxidized dye form.

Oxidation of leuco vat dyes as the final step in the manufacture of large quantities of the dyestuffs, involves the aeration of large quantities of slurries, often at high temperatures, and high pH's. The oxidation is customarily carried out at a high pH, since either by vatting or by manufacturing by reactions which form the leuco, highly alkaline mixtures are formed. This aeration of highly alkaline mixtures of leuco anthraquinones, at elevated temperatures usually takes a very long time, besides being tedious and expensive. The oxidation is often difficult, and at times, oxidizing chemicals such as sodium or potassium meta-nitrobenzene sulfonate, or a peroxide, or the like must be added. All these factors add to the cost of the vat dye, and present serious operational problems in the manufacture.

I have found a procedure of converting the leuco vat dyes to their oxo forms, which, at the least, eliminates the time consuming feature of the aeration, and in many cases, eliminates the oxidation as a separate step in the synthesis. This procedure is based on a reduction of the pH of the slurry of leuco vat dye to less than 10. In many cases, the reduction of the pH can be combined with the isolation of the leuco vat dye from a slurry in a medium insufficient in volume and temperature to dissolve it. The reduction of the pH is carried out by washing the leuco vat filter cake with a solution of a lower pH until the pH has been reduced to below 10, followed by washing with water until the washings are neutral. In a few cases, an alternative method is preferable, in which the filtered leuco vat dye is re-slurried and the pH is reduced to less than 10 in the slurry followed by filtration and washing with water. In either process, the reduction of the pH to below 10 must be carried out in the absence of reducing agents, and it is this requirement which at times necessitates the isolation of the leuco and re-slurrying before reducing the pH.

To effect the oxidation by the surprisingly simple and inexpensive procedure of my invention, it is only necessary to bring the pH of the vehicle or liquid in contact with the leuco dye below the value of about 10. Even if sufficient acidifying agent is added to bring the pH of the liquor down to the strongly acid range, such as a pH of 0.5 to 1.0, the improvement still results. Normally, such low pH's are not needed and only involve extra cost of reagents. It is therefore, particularly advantageous to operate in the pH range of 6.5 to 10, where the operation can be carried out in the same equipment used for the reduction. Such equipment is usually designed to be resistant to corrosion only on the alkaline side, and would be damaged by operation on the strongly acid side. Furthermore, in operations on the acid side an incomplete washing of the final filter cake may leave sufficient acid to cause corrosion from acidic fumes in the drying oven when the final oxidized vat dye is dried.

The reagents used to lower the pH below 10 include any water soluble agent known in the art which produces an aqueous solution of a pH of less than about 10. It may be one of various acids such as hydrochloric, sulfuric and similar compounds or it may be a buffering solution giving a pH of less than 10, or it may be a slightly alkaline material such as alkali metal bicarbonate, as for example, sodium or potassium bicarbonate. The buffering solutions include such familiar buffers as borax-boric acid, monosodium phosphate and buffers with other phosphates, and the like. In addition to the acids mentioned, there can also be used acetic, formic or carbonic acid. It is, from the standpoint of cost and convenience, preferable to use sodium or potassium bicarbonate, and this is the preferred specie of my invention. Sufficient of the agent is added to produce a pH of less than 10, preferably between 6.5 and 10.

Surprisingly, it has been found that plain water, which has a pH of about 7 is completely ineffective in accomplishing the purpose of my invention. In contrast, a buffering solution of a pH of about 7 is operative. It is therefore necessary to use pH lowering agents of the type described above in order to reduce the pH below 10 and the use of the terms pH lowering agents and aqueous solutions is intended to exclude water not containing such reagents.

The process of my invention may be used for the oxidation of various types of leuco vat dyes. In its broadest aspects, it is not restricted to any one class of vat dyes. However, with certain classes, there are specific advantages, and among these may be mentioned the vat dyes of the dibenzanthrone, indigoid, thioindigoid, pyranthrone, indanthrene, pyrenequinone, acedianthrone, and tetracarboxylic imide classes.

It is an advantage of my invention that the long and tedious aeration step is eliminated, without eliminating its function. This saving of one complete step in many cases effects a considerable saving in time and labor, which is reflected in the cost of the resultant dyestuffs. It is a further advantage, that the process of my invention eliminates the use of strongly alkaline solutions during a long aeration. Such alkaline solutions are not only corrosive but during the process of aeration tend to froth considerably. It is a further advantage, that it is not necessary to re-slurry a purified leuco vat dye in a strong caustic solution for oxidation by aeration or other means. It is an additional advantage, and a particularly important advantage, that the re-slurrying in any kind of a solution is often unnecessry since it is possible to achieve the oxidation by merely washing the leuco filter cake on the filter with a dilute buffering or an acidifying agent until the pH of the liquor surrounding the particle of the leuco vat dye drops below 10. The filter cake may then be washed to remove residual buffering or acidifying agents and at this stage the dyestuff is substantially in the purified oxidized state.

One important advantage of my invention, which is completely unexpected, is that certain decomposition dangers are avoided. When leuco indanthrone is isolated from an alkaline solution there is a great danger of decomposition. If such an alkaline leuco indanthrone filter cake is allowed to stand in the air it decomposes as it dries to give a product which is of little value as a vat dye. However, when the leuco indanthrone is directly filtered, and then, without allowing it to stand, is washed with a buffering solution, followed by washing out the excess buffering solution with water, a highly pure oxidized indanthrone is obtained.

It is necessary in the performance of my invention, that effective reducing agents be absent from the media surrounding the leuco vat dye. This factor differentiates my invention from the conventional vat acid process, in which the leuco vat dye is acidified in the presence of reducing agents for use in application to the fiber. That process is designed to produce stable leuco vat dyes for application to the cloth, for example in pastel shades where very uniform dyeings are required. The process of my invention has for its object the preparation of the oxo form of the vat dye directly from the leuco form without the necessity of using an additional separate oxidizing step.

Although I do not wish to be restricted to any theory concerning the process of my invention, it is possible that the actual oxidation of the leuco is due to the presence of small amounts of the dissolved oxygen in the water used in forming the buffering solution for washing, and in the water used for washing out the excess buffering solution. A slight modification of my invention can include the presence in one or the other of these solutions of small amounts of oxidized agent where the natural dissolved oxygen is insufficient to achieve complete oxidation. Thus, either the buffer solution or the wash water could contain small amounts of such things as oxidizing salts, hydrogen peroxide or organic oxidizing materials to assist in the oxidation. This is however, an expedient to use only in cases of extreme resistance to complete oxidation of the leuco to the oxo form. Normally, the washing with ordinary water, which has been exposed to the atmosphere, is sufficient.

My invention can be illustrated by the following examples which parts are by weight unless otherwise specified.

*Example 1*

An excess of sodium hydrosulfite is added to an alkaline slurry of crude indanthrone, partly in the leuco form and partly in the oxidized form, to reduce the dye completely to the leuco form. The crystallized leuco indanthrone is removed by filtration and the filter cake is washed on the filter with 1% sodium bicarbonate solution until a sample of the filtrate shows a pH of less than 10. After washing with water until free of alkalinity as shown by test with an indicator paper, there is obtained an excellent yield of oxidized indanthrone. The dyestuff is of excellent quality and may be used moist or may be dried and used for particular purposes.

*Example 2*

The process of Example 1 is followed except that the leuco filter cake is washed with a dilute borax-boric acid buffer solution of a pH of 8.1, in place of the 1% sodium bicarbonate solution. Rapid and complete oxidation occurs on the filter and the same yield of dyestuff of excellent quality as in Example 1 is obtained.

*Example 3*

The process of Example 1 is followed except that the leuco filter cake is reslurried in an excess of dilute hydrochloric acid solution instead of washing the cake on the filter with sodium bicarbonate solution. Sufficient dilute hydrochloric acid was used to produce a slurry with a pH of 0.9. After filtering the slurry, washing the product free of acid and drying, there is obtained a completely oxidized product of the same yield and excellent quality as in Example 1.

*Example 4*

The process of Example 3 is followed except that the filter cake is slurried in water and concentrated hydrochloric acid is added to produce a pH of about 0.9. Similar results are obtained.

*Example 5*

Crude 5,5'-dichloro-7,7'-dimethyl thioindigo is completely reduced in sodium hydroxide solution with sodium hydrosulfite. After filtration, the moist cake of the leuco dye is slurried in dilute sodium bicarbonate solution of pH about 8.0 and stirred vigorously several hours. The solid product is then removed by filtration and an excellent yield of completely oxidized dye of a desirable physical form is obtained.

The process of conditioning this dyestuff as used presently in the art requires approximately 60 hours of aeration of the alkaline vat to achieve the same results.

*Example 6*

Leuco isodibenzanthrone, purified by filtration from its impurities in solution, is obtained as a wet filter cake. This leuco filter cake is washed with a 2% sodium bicarbonate solution on the filter until the washings show a pH of about 9. It is then washed alkali-free with water, giving isodibenzanthrone of excellent quality, completely in the oxidized form.

Similar results are obtained if the moist cake is slurried in 1% sodium bicarbonate solution and isolated as above. In either case the oxidation occurs spontaneously during the washing or slurrying operation.

*Example 7*

A crude alkaline press cake of leuco pyranthrone is slurried in water and sodium bicarbonate is added until the pH of the slurry is about 9.5. Filtration and washing gives completely oxidized pyranthrone of excellent quality.

Similar results are obtained if crude pyranthrone moist press cake is washed with 1% sodium bicarbonate solution. Complete oxidation takes place spontaneously during the washing process.

I claim:

1. In a process of manufacturing vat dyes selected from the group consisting of indanthrone, isodibenzanthrone, pyranthrone and 5,5'-dichloro-7,7'-dimethylthioindigo which comprises as a last manipulation in such manufacture the oxidation of the leuco vat dye to the oxo form, the improvement which comprises bringing about such oxidation by forming a mixture of a solid salt of the leuco vat dye with water, insufficient in amount to dissolve said salt, and a pH lowering agent, such that said mixture has a pH less than 10 but not below 6.5 and is free of reducing agents.

2. In a process of manufacturing vat dyes selected from the group consisting of indanthrone, isodibenzanthrone, pyranthrone and 5,5'-dichloro-7,7'-dimethylthioindigo which comprises as a last manipulation in such manufacture the oxidation of the leuco vat dye to the oxo form, the improvement which comprises bringing about such oxidation by filtering the precipitate from a slurry of a salt of said leuco vat dye in an aqueous medium insufficient in amount completely to dissolve said salt, and washing said precipitate with a dilute solution of a pH less than 10 but not below 6.5 until said washings have a pH less than 10.

3. The process of claim 1 in which said reduction of the pH of the said precipitate is followed by washing said precipitate with water.

4. The process of claim 2 in which the wash solution is a buffer solution of borax and boric acid.

5. The process of claim 2 in which the washing solution contains sodium bicarbonate.

6. The process of claim 1 in which the leuco vat dye salt is that of indanthrone.

7. The process of claim 1 in which the leuco vat dye salt is that of isodibenzanthrone.

8. The process of claim 1 in which the leuco vat dye salt is that of pyranthrone.

9. The process of claim 1 in which the leuco vat dye salt is 5,5'-dichloro-7,7'-dimethyl thioindigo.

10. In a process of manufacturing vat dyes selected from the group consisting of indanthrone, isodibenzanthrone, pyranthrone and 5,5'-dichloro-7,7'-dimethylthioindigo, which comprises as a last manipulation in said manufacture the oxidation of the leuco vat dye to the oxo form, the improvement which comprises bringing about such oxidation by forming a slurry of a salt of said leuco vat dye in an aqueous medium in insufficient amounts completely to dissolve said salt, said aqueous medium being free of reducing agents and having a pH of less than 10 but not below 6.5 and filtering the precipitate from said slurry.

11. The process of claim 10 in which the said filtered precipitate is washed with water until said precipitate is neutral.

12. The process of claim 10 in which the said slurry contains a buffer solution of borax and boric acid.

13. The process of claim 10 in which the said slurry is a dilute solution of sodium bicarbonate.

14. The process of claim 10 in which the leuco vat dye salt is that of indanthrone.

15. The process of claim 10 in which the leuco vat dye salt is that of isodibenzanthrone.

16. The process of claim 10 in which the leuco vat dye salt is that of pyranthrone.

17. The process of claim 10 in which the leuco vat dye salt is that of 5,5'-dichloro-7,7'-dimethylthioindigo.

References Cited in the file of this patent

UNITED STATES PATENTS

| | | |
|---|---|---|
| 893,468 | Engl | July 14, 1908 |
| 943,678 | Homolka et al. | Dec. 21, 1909 |
| 1,150,863 | Just | Aug. 24, 1915 |
| 1,802,640 | Ewing et al. | Apr. 28, 1931 |
| 2,027,144 | Bake | Jan. 7, 1936 |
| 2,136,428 | Fox | Nov. 15, 1938 |
| 2,189,012 | Lord et al. | Feb. 6, 1940 |
| 2,590,213 | Sandor | Mar. 25, 1952 |